(12) United States Patent
Sim

(10) Patent No.: US 12,118,961 B2
(45) Date of Patent: Oct. 15, 2024

(54) DISPLAY DEVICE AND CONTROL METHOD THEREOF

(71) Applicant: SAMSUNG ELECTRONICS CO., LTD., Suwon-si (KR)

(72) Inventor: Jihye Sim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/122,235

(22) Filed: Mar. 16, 2023

(65) Prior Publication Data

US 2023/0222993 A1 Jul. 13, 2023

Related U.S. Application Data

(63) Continuation of application No. PCT/KR2021/013504, filed on Oct. 1, 2021.

(30) Foreign Application Priority Data

Nov. 17, 2020 (KR) ........................ 10-2020-0153734

(51) Int. Cl.
G09G 5/22 (2006.01)
(52) U.S. Cl.
CPC ..... G09G 5/227 (2013.01); G09G 2340/0435 (2013.01)
(58) Field of Classification Search
None
See application file for complete search history.

(56) References Cited

U.S. PATENT DOCUMENTS

| 9,661,262 | B2 | 5/2017 | Miyauchi |
| 10,061,465 | B2 | 8/2018 | Oh et al. |
| 10,306,338 | B2 | 5/2019 | Kim et al. |
| 10,529,272 | B2 | 1/2020 | Kim et al. |
| 10,788,946 | B2 | 9/2020 | Oh et al. |

(Continued)

FOREIGN PATENT DOCUMENTS

| JP | 2009-111936 A | 5/2009 |
| JP | 2015-195572 A | 11/2015 |

(Continued)

OTHER PUBLICATIONS

International Search Report issued in International Application No. PCT/KR2021/013504 dated Jan. 14, 2022.

(Continued)

*Primary Examiner* — Ifedayo B Iluyomade
(74) *Attorney, Agent, or Firm* — STAAS & HALSEY LLP

(57) ABSTRACT

A display device comprising: a display panel to display a frame having a resolution up to a first frame rate; a plurality of image processing units; and a processor. The processor configured to, based on change from a first mode of displaying a content, among a plurality of modes of the display device, to a second mode of displaying plural contents, change frame rates of a plurality of contents output from the plurality of image processing units to a same frame rate, mix the plurality of contents with the frame rates changed to the same frame rate, and change a vertical resolution of the mixed content. The display panel is enabled to output the mixed content, at a second frame rate greater than the first frame rate.

20 Claims, 16 Drawing Sheets

(56) References Cited

U.S. PATENT DOCUMENTS

| | | | |
|---|---|---|---|
| 2013/0169755 A1* | 7/2013 | Choo | H04N 13/341 |
| | | | 348/46 |
| 2013/0246919 A1 | 9/2013 | Oh et al. | |
| 2014/0160354 A1 | 6/2014 | Park et al. | |
| 2014/0267285 A1* | 9/2014 | Lee | G06T 5/00 |
| | | | 345/428 |
| 2015/0020119 A1 | 1/2015 | Kim et al. | |
| 2015/0281638 A1 | 10/2015 | Miyauchi | |
| 2016/0100129 A1* | 4/2016 | Im | H04N 7/014 |
| | | | 348/441 |
| 2018/0348919 A1 | 12/2018 | Oh et al. | |
| 2019/0043413 A1 | 2/2019 | Kim et al. | |

FOREIGN PATENT DOCUMENTS

| | | |
|---|---|---|
| KR | 10-1153740 B1 | 6/2012 |
| KR | 10-2013-0076674 A | 7/2013 |
| KR | 10-2014-0073237 A | 6/2014 |
| KR | 10-2014-0111736 A | 9/2014 |
| KR | 10-2015-0008739 A | 1/2015 |
| KR | 10-1553846 B1 | 9/2015 |
| KR | 10-1604492 B1 | 3/2016 |
| KR | 10-2016-0040388 A | 4/2016 |
| KR | 10-1644422 B1 | 8/2016 |
| KR | 10-2019-0014302 A | 2/2019 |

OTHER PUBLICATIONS

Written Opinion issued in International Application No. PCT/KR2021/013504 dated Jan. 14, 2022.

Office Action dated Mar. 25, 2024 for corresponding Korean application No. 10-2020-0153734.

Office Action dated May 25, 2024 for corresponding Korean application No. 10-2020-0153734.

* cited by examiner

1. REPEAT OCCURS WHEN SYNCHRONIZED TO A HIGH FRAME RATE

SMALLER THAN OR EQUAL TO 3840X2160 60Hz INPUT1: | 1 | 2 | 3 | 4 | 5 | 6 |

SMALLER THAN OR EQUAL TO 3840X2160 30Hz INPUT2: | 1 | 1 (REPEAT) | 2 | 2 (REPEAT) | 3 | 3 (REPEAT) |

2. SCALE & MIX (3840 × 1080@120Hz, 60->120Hz REPEAT OCCURS)

3. MULTI(DUAL) LINE GATE IS OUTPUT(3840 × 2160@120Hz)

FIG. 5B

1. SKIP OCCURS WHEN SYNCHRONIZED TO A LOW FRAME RATE

SMALLER THAN OR EQUAL TO 3840X2160 30Hz INPUT1: | 1 | 2 | 3 |

SMALLER THAN OR EQUAL TO 3840X2160 60Hz INPUT2: | 1 | 2 (SKIP) | 3 | 4 (SKIP) | 5 | 6 (SKIP) |

2. SCALE & MIX (3840×1080@120Hz, 30->120Hz REPEAT OCCURS)

| 1 | 1 | 1 | 1 | 2 | 2 | 2 | 2 | 3 | 3 | 3 | 3 |
| 1 | 1 | 1 | 1 | 3 | 3 | 3 | 3 | 5 | 5 | 5 | 5 |

3. MULTI(DUAL) LINE GATE IS OUTPUT(3840×2160@120Hz)

| 1 | 1 | 1 | 1 | 2 | 2 | 2 | 2 | 3 | 3 | 3 | 3 |
| 1 | 1 | 1 | 1 | 3 | 3 | 3 | 3 | 5 | 5 | 5 | 5 |

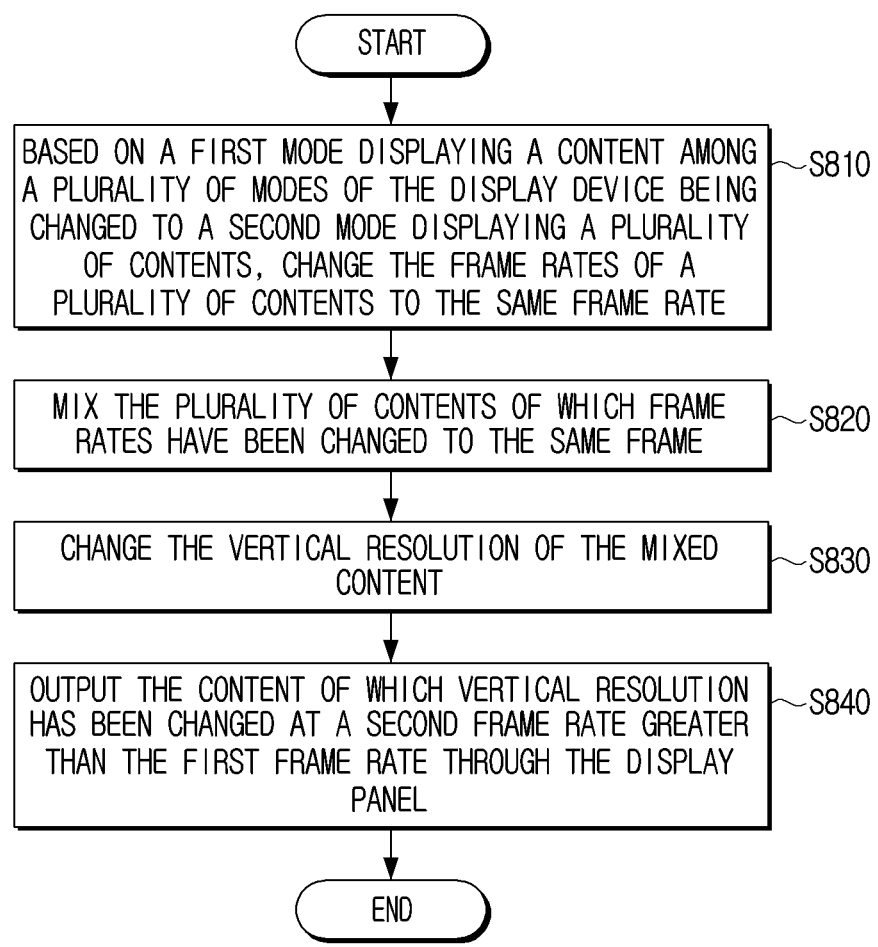

DISPLAY DEVICE AND CONTROL METHOD THEREOF

CROSS-REFERENCE TO RELATED APPLICATION(S)

This application is a continuation application, under 35 U.S.C. § 111(a), of international application No. PCT/KR2021/013504, filed on Oct. 1, 2021, which claims priority under 35 U.S.C. § 119 to Korean Patent Application No. 10-2020-0153734, filed on Nov. 17, 2020, the disclosures of which are incorporated herein by reference in their entirety.

BACKGROUND

Field

The disclosure relates to a display device and a control method thereof, and more particularly, to a display device that processes a content as an image, and displays the content processed as an image, and a control method thereof.

Description of the Related Art

With the development of image devices, contents of a high quality are being manufactured. In particular, recently, contents having frame rates of 120 Hz or higher are being manufactured.

In the case of reproducing such a content, if an operation frequency of a display device is 120 Hz or higher, the content may be displayed as the frame rate of the content as it is, but in most conventional display devices, the operation frequencies are 60 Hz or lower in many cases.

For example, as illustrated in FIG. 1, a display device operating in 60 Hz displays a content while omitting some frames of the content for reproducing the content of 120 Hz. In this case, there is a problem that the content is not reproduced smoothly.

As the simplest method of resolving such a problem, there may be a method of improving the hardware specification of a display device. However, there is a problem that the manufacturing cost increases for the display device to reproduce a content having a frame rate of 120 Hz or higher.

Accordingly, there is a need for development of a method for saving the manufacturing cost of a display device, and at the same time, smoothly reproducing a content of a frame rate higher than the operation frequency of the display device.

In particular, recently, a multi-view function of providing a plurality of contents in a picture in picture (PIP) mode, a picture of picture (POP) mode, etc. is required, and there is also a demand for development of a method for providing a multi-view function, and at the same time, smoothly displaying a plurality of contents.

SUMMARY

According to an embodiment of the disclosure for achieving the aforementioned purpose, a display device includes a display panel to display a frame having a resolution up to a frame rate, a plurality of image processing units, and a processor configured to, based on change from a first mode of displaying a content, among a plurality of modes of the display device, to a second mode displaying plural contents, among the plurality of modes of the display device, change frame rates of a plurality of contents output from the plurality of image processing units to a same frame rate, mix the plurality of contents with the frame rates having been changed to the same frame rate, and change a vertical resolution of the mixed content, and the display panel may output the mixed content of which the vertical resolution has been changed at a second frame rate greater than the first frame rate.

Also, the processor may, change the frame rates of the plurality of contents to the same frame rate, mix the plurality of contents of which frame rates have been changed to the same frame rate, and change the vertical resolution of the mixed content based on at least one of the plurality of contents being a predetermined type.

In addition, the processor may identify types of the plurality of contents based on metadata of the plurality of contents, and the predetermined type may be one of contents and sport contents of greater than or equal to a threshold frame rate.

Further, the processor may skip or repeat frames of remaining contents among the plurality of contents based on one of the plurality of contents output from the plurality of image processing units and change the frame rates of the plurality of contents to the same frame rate.

Also, the display device may further include a frame rate change unit that receives the mixed content of which vertical resolution has been changed from the processor, and changes the frame rate of the content of which vertical resolution has been changed to the second frame rate, and the display panel may output the mixed content at the second frame rate.

In addition, the frame rate change unit may, based on the frame rate of the mixed content of which vertical resolution has been changed being smaller than the second frame rate, change the frame rate of the content of which vertical resolution has been changed to the second frame rate through copying or interpolation of the frame of the content of which vertical resolution has been changed.

Further, the display device may further include a plurality of frame rate change units connected to each of the plurality of image processing units, and the plurality of frame rate change units may change the plurality of contents output from the plurality of image processing units to the second frame rate, and provide the plurality of contents changed to the second frame rate to the processor.

Also, the processor may, based on one of the plurality of contents being a variable refresh rates (VRR) content, change the frame rates of the plurality of contents to correspond to the VRR content.

In addition, the processor may change the vertical resolution of the mixed content based on an equal division value of a vertical resolution of the display panel.

Further, the display panel may include a plurality of gate lines and a plurality of data lines, and the display device may simultaneously drive two or more adjacent gate lines among the plurality of gate lines based on the resolution of the display panel and the vertical resolution of the mixed content, and each of the plurality of data lines may provide data to pixels of a same column.

Meanwhile, according to an embodiment of the disclosure, a control method of a display device comprising a display panel to display a frame of a resolution up to a first frame rate includes the operations of, based on change from a first mode of displaying a content, among a plurality of modes of the display device, to a second mode of displaying a plurality of contents, among the plurality of modes of the display device, changing frame rates of a plurality of contents to a same frame rate, mixing the plurality of contents with the frame rates having been changed to the same frame rate, changing a vertical resolution of the mixed content, and outputting the mixed content of which the vertical resolution has been changed at a second frame rate greater than the first frame rate through the display panel.

Also, the vertical resolution of the mixed content is changed based on at least one of the types of the plurality of contents being a predetermined type.

In addition, in the changing the vertical resolution of the mixed content, types of the plurality of contents may be identified based on metadata of the plurality of contents, and the predetermined type may be one of contents and sport contents of greater than or equal to a threshold frame rate.

Further, in the changing to the same frame rate, frames of remaining contents among the plurality of contents may be skipped or repeated based on one of the plurality of contents output from a plurality of image processing units and the frame rates of the plurality of contents may be changed to the same frame rate.

Also, the control method may further include changing the frame rate of the content with the vertical resolution having been changed to the second frame rate, and in the operation of outputting at the second frame rate, the content changed to the second frame rate may be output through the display panel.

In addition, in the changing to the second frame rate, based on the frame rate of the content of which vertical resolution has been changed being smaller than the second frame rate, the frame rate of the content of which vertical resolution has been changed may be changed to the second frame rate through copying or interpolation of the frame of the content of which vertical resolution has been changed.

Further, the control method may further include the operation of changing the plurality of contents with frame rates having been changed to the same frame rate to the second frame rate, and in the mixing operation, the plurality of contents changed to the second frame rate may be mixed.

Also, in the operation of changing to the same frame rate, based on one of the plurality of contents being a variable refresh rates (VRR) content, the frame rates of the plurality of contents may be changed to correspond to the VRR content.

In addition, in the operation of changing the vertical resolution of the mixed content, the vertical resolution of the mixed content may be changed based on an equal division value of the vertical resolution of the display panel.

Further, the display panel may include a plurality of gate lines and a plurality of data lines, and each of the plurality of data lines may provide data to pixels of the same column, and in the operation of outputting, two or more adjacent gate lines among the plurality of gate lines may be simultaneously driven based on the resolution of the display panel and the vertical resolution of the mixed content.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5A and FIG. 5B are diagrams for illustrating a frame rate changing operation according to an embodiment of the disclosure;

FIG. 8 is a flow chart for illustrating a control method of a display device according to an embodiment of the disclosure.

DETAILED DESCRIPTION

Figure 1:
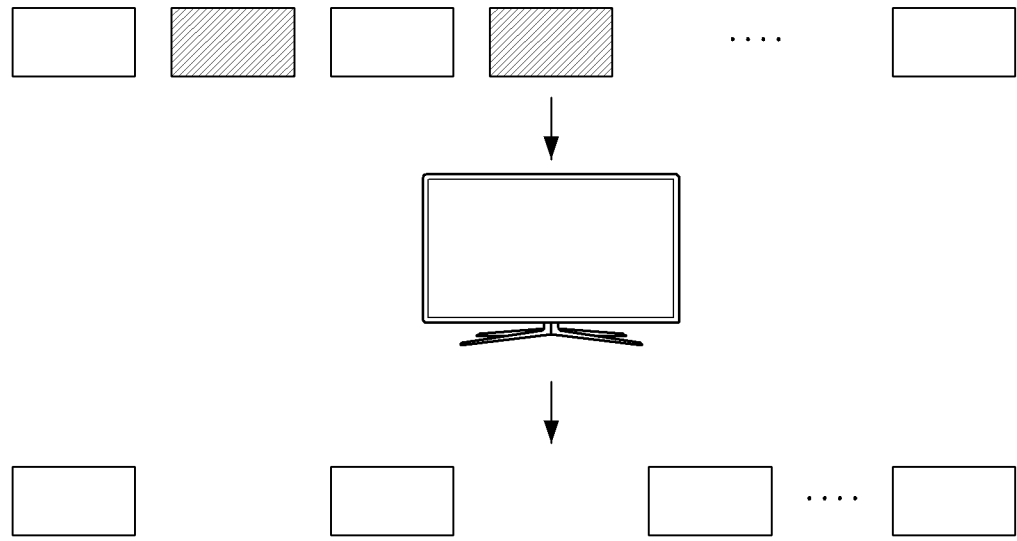
FIG. 1 is a diagram for illustrating the problem of the conventional technology.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

Also, singular expressions include plural expressions, as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in this specification, the term "user" may refer to a person who uses a display device or a device using a display device (e.g.: an artificial intelligence electronic device).

The disclosure is for addressing the aforementioned need, and the purpose of the disclosure is in providing a display device for outputting a plurality of contents in a frame rate higher than the operation frequency of the display device, and a control method thereof.

According to the various embodiments of the disclosure as described above, the display device can improve the response characteristic by mixing a plurality of contents, and reducing the time that frames are displayed by adjusting the resolution of the frames of the mixed content.

Also, as the display device can operate at a relatively smaller operation frequency than the frame rate of the mixed content, the display device can be implemented at a low cost.

In particular, as a content is produced in a high resolution recently, the image quality felt by a viewer is not reduced so much even if the vertical resolution of a mixed content is reduced to half, and at the same time, a feeling that the response characteristic has been improved can be provided.

Hereinafter, an embodiment of the disclosure will be described in more detail with reference to the accompanying drawings.

Figure 2A:
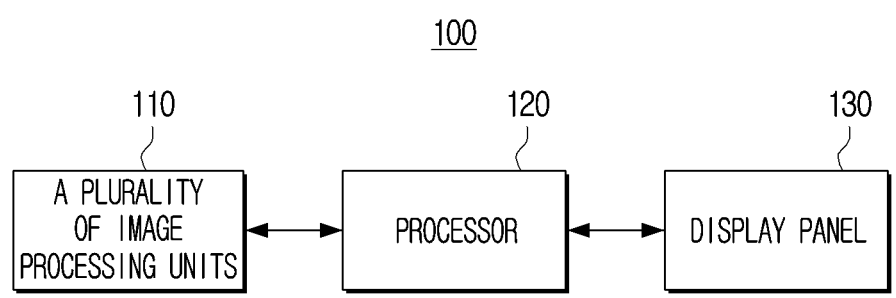
FIG. 2A is a block diagram illustrating a configuration of a display device according to an embodiment of the disclosure.

FIG. 2A is a block diagram illustrating a configuration of a display device 100 according to an embodiment of the disclosure.

The display device 100 is a device that displays contents, and it may be a TV, a desktop PC, a laptop computer, a video wall, a large format display (LFD), digital signage, a digital information display (DID), a projector display, a digital video disk (DVD) player, a refrigerator, a washing machine, a smartphone, a tablet PC, a monitor, smart glasses, a smart watch, etc., and it can be any device if it is a device that can display contents.

According to FIG. 2A, the display device 100 includes a plurality of image processing units 110, a processor 120, and a display panel 130. However, the disclosure is not limited thereto, and the display device 100 may be implemented in a form wherein some components are excluded, or may be implemented in a form wherein other components are further included.

Each of the plurality of image processing units 110 may receive a content, and process the received content as an image. For example, each of the plurality of image processing units 110 may decode a received content.

The processor 120 may change the frame rates of a plurality of contents output from the plurality of image processing units 110 to the same frame rate. For example, the processor 120 may skip or repeat the frames of the remaining contents based on one of the plurality of contents output from the plurality of image processing units 110 and change the frame rates of the plurality of contents to the same frame rate. In particular, if a first mode displaying a content among a plurality of modes of the display device 100 is changed to a second mode displaying a plurality of contents, the processor 120 may change the frame rates of the plurality of contents output from the plurality of image processing units 110 to the same frame rate.

For example, if a first content of 60 Hz and a second content of 120 Hz are received from the plurality of image processing units 110, the processor 120 may skip some of the frames of the second content of 120 Hz based on the first content of 60 Hz, or repeat the frames of the first content of 60 Hz based on the second content of 120 Hz. In the case of the former, the second content may be changed to 60 Hz, and in the case of the latter, the first content may be changed to 120 Hz.

Alternatively, if one of the plurality of contents is a variable refresh rates (VRR) content, the processor 120 may change the frame rates of the plurality of contents to correspond to the VRR content.

In case the frame rates of the plurality of contents output from the plurality of image processing units 110 are the same, the processor 120 may not change the frame rates of the plurality of contents.

The processor 120 may mix the plurality of contents of which frame rates have been changed to the same frame rate. In the aforementioned example, the processor 120 may mix the first content and the second content in a picture in picture (PIP) form, a picture of picture (POP) form, etc. However, the disclosure is not limited thereto, and the processor 120 can mix the plurality of contents by numerous various methods, and display the contents.

For example, the processor 120 may divide the screen into three areas, and display the first content, the second content, and the third content in each of the three areas, or display two or more contents in a PIP form, a POP form, or other different forms.

The processor 120 may change the vertical resolution of the mixed content. In particular, the processor 120 may change the vertical resolution of the mixed content based on an equal division value of the vertical resolution of the display panel 130. For example, in case the display panel 130 is a panel of a 7680×4320 resolution, the processor 120 may adjust the resolution of the mixed content to 7680×2160 based on a bisected division value of the vertical resolution 4320 of the display panel 130.

Due to an operation of changing the resolution by the scaler 140, a content may be output at a frame rate that is higher than the operation frequency of the display panel 130, and this will be described in detail together with the display panel 130.

Meanwhile, if at least one of the types of the plurality of contents is a predetermined type, the scaler 140 may change the frame rates of the plurality of contents to the same frame rate, and mix the plurality of contents of which frame rates have been changed to the same frame rate, and change the vertical resolution of the mixed content. Here, the processor 120 may identify the types of the plurality of contents based on metadata of the plurality of contents, and the predetermined type may be one of contents and sport contents of greater than or equal to a threshold frame rate. However, the disclosure is not limited thereto, and any method can be applied if it is a method for identifying types of contents.

The processor 120 may be implemented in the form of an independent IC. Also, the processor 120 may include a scaler performing at least one operation among scaling for a content, frame rate change of a content, or mixing of a plurality of contents. However, the disclosure is not limited thereto, and the processor 120 may control general operations of the display device 100, and the operation of the processor 120 in FIG. 2A may be performed by a scaler that is provided separately from the processor 120. Explanation in this regard will be described in FIG. 2B.

The display panel 130 may display a frame of a first resolution up to a first frame rate. For example, the display panel 130 may display a frame of a 7680×4320 resolution in 60 Hz or lower.

The display panel 130 may include a plurality of gate lines and a plurality of data lines. The display panel 130 may sequentially drive the plurality of gate lines one by one. For example, the display panel 130 of a 7680×4320 resolution may include 4320 gate lines. Then, the display panel 130 may sequentially drive the plurality of gate lines one by one, and output the frames of a 7680×4320 resolution in 60 Hz. That is, in case the display panel 130 sequentially drives the gate lines one by one, the plurality of frames of the first resolution may be displayed up to the first frame rate.

The display panel 130 may simultaneously drive two or more adjacent gate lines among the plurality of gate lines, and output a content of which vertical resolution has been changed. In the aforementioned example, if a content of a 7680×2160 resolution in 120 Hz is output from the processor 120, the display panel 130 may simultaneously drive two adjacent gate lines among the plurality of gate lines, and output the content output from the processor 120 in 120 Hz. Specifically, if a content of a 7680×2160 resolution in 120 Hz is output from the processor 120, the display panel 130 may simultaneously drive two adjacent gate lines and thereby reduce the time of outputting a frame of a 7680× 2160 resolution to half, and accordingly, output in 120 Hz is possible. That is, the display panel 130 may output a content of which vertical resolution has been changed at a second frame rate greater than the first frame rate by simultaneously driving two or more adjacent gate lines among the plurality of gate lines. Here, each of the plurality of data lines may provide data to pixels of the same column.

The display panel 130 may include a timing controller (TCON) that controls the plurality of gate lines included in the display panel 130. The timing controller may receive input of an input signal (IS), a horizontal synchronization signal (Hsync), a vertical synchronization signal (Vsync), and a main clock signal (MCLK), etc. from the outside, and generate an image data signal, a scan control signal, a data control signal, a light emission control signal, etc., and thereby control the display panel 130. However, the disclosure is not limited thereto, and the timing controller may be included in the processor 120, or it may be implemented in the form of an independent IC.

Hereinafter, the operations of the processor 120 and the display panel 130 as above will be referred to as a dual line gating (DLG) mode. However, this is merely a name for the convenience of explanation, and it may also include a case of simultaneously driving three or more adjacent gate lines.

In FIG. 2A, only minimum components necessary for the operations in the disclosure were illustrated, but the display device 100 may further include other components, and explanation in this regard will be described through FIG. 2B.

Figure 2B:
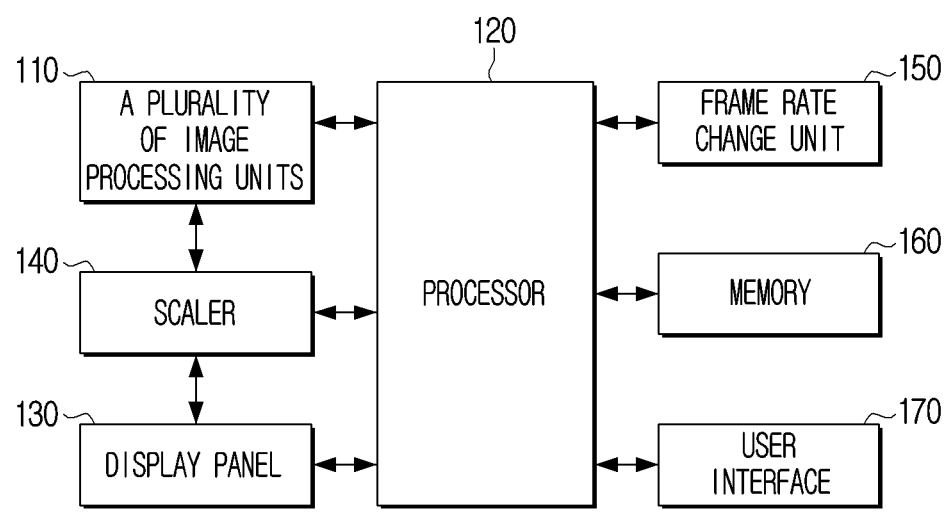
FIG. 2B is a block diagram illustrating a configuration of a display device according to another embodiment of the disclosure.

FIG. 2B is a block diagram illustrating a configuration of the display device 100 according to another embodiment of the disclosure. In FIG. 2B, an embodiment wherein the scaler 140 is implemented separately from the processor 120 is described. In this case, the operation of the processor 120 in FIG. 2A may be performed by the scaler 140.

According to FIG. 2B, the display device 100 may include not only the plurality of image processing units 110, the processor 120, and the display panel 130, but may also further include a scaler 140, a frame rate change unit 150, a memory 160, and a user interface 170. Among the components in FIG. 2B, regarding components overlapping with those in FIG. 2A, explanation will be omitted.

The processor 120 controls the overall operations of the display device 100. Specifically, the processor 120 may be connected with each component of the display device 100, and control the overall operations of the display device 100. For example, the processor 120 may be connected with components such as the plurality of image processing units 110, the display panel 130, the scaler 140, the frame rate change unit 150, the memory 160, the user interface 170, etc., and control the operations of the display device 100.

According to an embodiment, the processor 120 may be implemented as a digital signal processor (DSP), a microprocessor, and a time controller (TCON). However, the disclosure is not limited thereto, and the processor 120 may include one or more of a central processing unit (CPU), a micro controller unit (MCU), a micro processing unit (MPU), a controller, an application processor (AP) or a communication processor (CP), and an ARM processor, or may be defined by the terms. Also, the processor 120 may be implemented as a system on chip (SoC) having a processing algorithm stored therein or large scale integration (LSI), or in the form of a field programmable gate array (FPGA).

The processor 120 may determine one of the modes of the display device 100 based on the number of at least one content. For example, if a content is input, the processor 120 may determine the mode of the display device 100 as the first mode, process the one content as an image, and display the content processed as an image. Alternatively, if a plurality of contents are input, the processor 120 may determine the mode of the display device 100 as the second mode, process the plurality of contents as images, and display the contents processed as images. Here, in the image processing, an operation of mixing the plurality of contents may be included.

The processor 120 may subdivide the second mode based on the plurality of contents. For example, if at least one of the types of the plurality of contents is a predetermined type, the processor 120 may control the display panel 130 and the scaler 140 to operate in the DLG mode. Here, the predetermined type may be one of contents and sport contents of greater than or equal to a threshold frame rate.

Alternatively, if the types of the plurality of contents are not the predetermined type, the processor 120 may control the display panel 130 and the scaler 140 to operate in a general mode. In the case of operating in the general model, the scaler 140 may adjust the resolution of a mixed content to correspond to the resolution of the display panel 130, and the display panel 130 may sequentially drive the plurality of gate lines one by one.

If at least one type among the plurality of contents is changed to the predetermined type while operating in the general mode, the processor 120 may change the general mode to the DLG mode. Alternatively, the processor 120 may identify motion values of each of the plurality of contents, and if at least one among each identified motion value exceeds a threshold value, the processor 120 may change the general mode to the DLG mode. Here, the processor 120 may acquire motion values through a method of comparing adjacent frames, but the disclosure is not limited thereto, and the processor 120 can acquire motion values by numerous various methods.

The processor 120 may control the operation of the scaler 140 based on at least one of the number of the plurality of contents or whether the frame rate change unit 150 is driven. For example, in case the number of the plurality of contents is greater than or equal to a threshold number or the frame rate change unit 150 to be described below is driven, the processor 120 may control the scaler 140 to change the frame rates of the plurality of contents to the smallest value among the frame rates of the plurality of contents. In this case, the processor 120 may control the frame rate change unit 150 to upscale the frame rate of the mixed content output from the scaler 140. Here, the processor 120 may determine whether to drive the frame rate change unit 150 in consideration of the load according to image processing, power consumption, etc.

The processor 120 may control the operation of the frame rate change unit 150 based on the operation mode of the display device 100, the operation frequency of the display panel 130, and the frame rate of the mixed content output from the scaler 140.

For example, in case the display device 100 operates in the DLG mode, the processor 120 may acquire a scaling magnification based on a multiple of the operation frequency of the display panel 130 and the frame rate of the mixed content, and control the operation of the frame rate change unit 150 based on the acquired scaling magnification. Alternatively, in case the display device 100 operates in the general mode, the processor 120 may acquire a scaling magnification based on the operation frequency of the display panel 130 and the frame rate of the mixed content, and control the operation of the frame rate change unit 150 based on the acquired scaling magnification.

The frame rate change unit 150 may receive a content of which vertical resolution has been changed from the scaler 140, and change the frame rate of the content of which vertical resolution has been changed to the second frame rate. Here, if the frame rate of the content of which vertical resolution has been changed is smaller than the second frame rate, the frame rate change unit 150 may change the frame rate of the content of which vertical resolution has been changed to the second frame rate through copying or interpolation of the frame of the content of which vertical resolution has been changed.

The display panel 130 may receive the content of which frame rate has been changed to the second frame rate from the frame rate change unit 150, and output the received content at the second frame rate.

In the case of the aforementioned operation, the frame rate change unit 150 may be in a state (not shown) of being connected between the display panel 130 and the scaler 140.

However, this is merely an example, and the frame rate change unit 150 may be in a state (not shown) of being connected between the plurality of image processing units 110 and the scaler 140. In this case, the frame rate change unit 150 may be implemented as a plurality of frame rate change units, and the plurality of frame rate change units 150 may be respectively connected to the plurality of image processing units. The plurality of frame rate change units 150 may change the frame rates of the plurality of contents output from the plurality of image processing units 110 to the second frame rate, and provide the plurality of contents of which frame rates have been changed to the second frame rate to the scaler 140. In this case, the scaler 140 may mix the plurality of contents of which frame rates have been changed to the second frame rate, adjust the resolution of the mixed content, and output the content to the display panel 130.

The frame rate change unit 150 may copy or interpolate frames, and has a superior capability of scaling processing to the scaler 140 which cannot perform interpolation. That is, in case a plurality of frame rate change units 150 are provided, the processing performance for each of the plurality of contents is improved, but the manufacturing cost may increase. In contrast, in case only one frame rate change unit 150 is provided, the manufacturing cost may be saved, but there is a restriction that scaling is possible only for a mixed content.

The memory 160 may store a content. The processor 120 may process the content stored in the memory 160 as an image, and display the image through the display panel 130. Also, the memory 160 may store information for displaying other contents.

The memory 160 may be implemented as a non-volatile memory and a volatile memory, etc., but is not limited thereto. For example, a hard disk may be used instead of a memory, and any component is possible if it is a component that can store data.

The user interface 170 receives various user interactions. Here, the user interface 170 may be implemented in various forms according to implementation examples of the display device 100. For example, the user interface 170 may be a button provided on the display device 100, a microphone receiving a user voice, a camera detecting a user motion, etc. Alternatively, in case the display device 100 is implemented as a terminal device based on touches, the user interface 170 may be implemented in the form of a touch screen that constitutes an inter-layer structure with a touch pad. In this case, the user interface 170 may be one component of the display panel 130 described above.

The processor 120 may change the operation mode of the display device 100 based on a user instruction received through the user interface 170.

Meanwhile, the display device 100 may further include a communication interface (not shown). The communication interface is a component that performs communication with various types of external devices according to various types of communication methods. The communication interface includes a Wi-Fi module, a Bluetooth module, an infrared communication module, and a wireless communication module, etc. Here, each communication module may be implemented in the form of at least one hardware chip.

The processor 120 may perform communication with various types of external devices by using the communication interface. Here, the external devices may include a server, Bluetooth earphones, an electronic device, etc.

A Wi-Fi module and a Bluetooth module perform communication by using a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

Other than the above, the communication interface may include at least one of a local area network (LAN) module, an Ethernet module, or a wired communication module that performs communication by using a pair cable, a coaxial cable, an optical fiber cable, etc.

The communication interface may further include an input/output interface. The input/output interface may be an interface of any one of a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), or a digital visual interface (DVI).

The input/output interface may input or output at least one of an audio signal or a video signal.

Depending on implementation examples, the input/output interface may include a port inputting or outputting only audio signals and a port inputting or outputting only video signals as separate ports, or may be implemented as one port that inputs or outputs both audio signals and video signals.

Figure 2C:
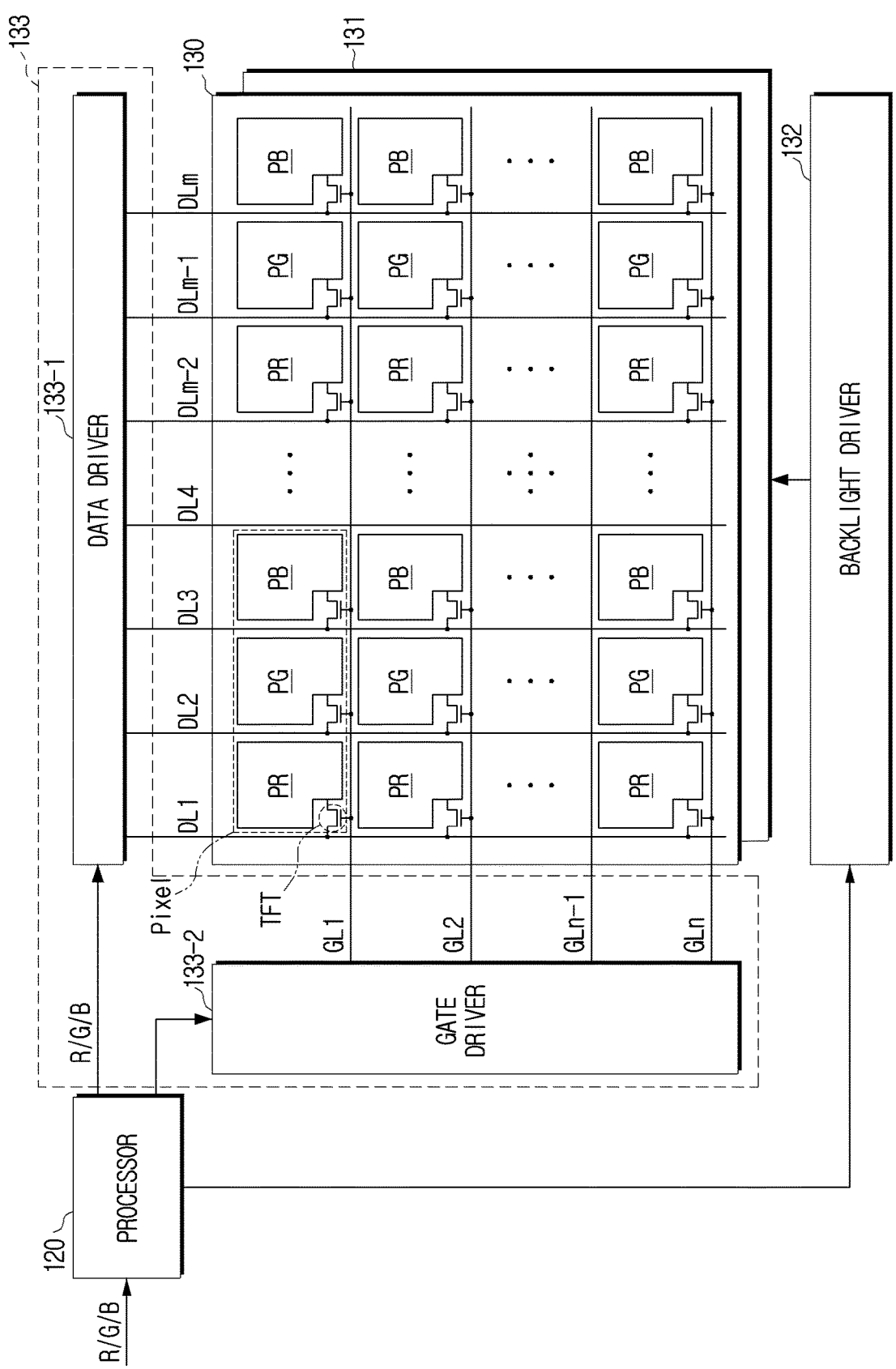
FIG. 2C is a diagram for illustrating a configuration of a display panel according to an embodiment of the disclosure.

FIG. 2C is a diagram for illustrating a configuration of the display panel 130 according to an embodiment of the disclosure.

The display panel 130 may be formed such that gate lines (GL1 to GLn) and data lines (DL1 to DLm) intersect one another, and in the area wherein the gate lines and the data lines are provided in an intersecting manner, R, G, and B sub-pixels (PR, PG, PB) may be formed. Adjacent R, G, and B sub-pixels (PR, PG, PB) constitute one pixel. That is, each pixel may include an R sub-pixel (PR) displaying a red color (R), a G sub-pixel (PG) displaying a green color (G), and a B sub-pixel (PB) displaying a blue color (B), and reproduce the color of an object with the three primary colors of a red color (R), a green color (G), and a blue color (B).

In case the display panel 130 is implemented as an LCD panel, each sub-pixel (PR, PG, PB) may include a pixel electrode and a common electrode, and the liquid crystal arrangement changes with an electric field formed due to a potential difference between the two electrodes, and accordingly, the light transmissivity changes. TFTs formed in the intersecting part of the gate lines (GL1 to GLn) and the data lines (DL1 to DLm) may respectively respond to scan pulses from the gate lines (GL1 to GLn), and provide video data from the data lines (DL1 to DLm), i.e., the red (R), the green (G), and the blue (B) data to the pixel electrodes of each sub-pixel (PR, PG, PB).

The display panel 130 may further include a backlight unit 131, a backlight driver 132, and a panel driver 133.

The backlight driver 132 may be implemented in a form of including a driver IC for driving the backlight unit 131. According to an embodiment, the driver IC may be implemented as separate hardware from the processor 120. For example, in case light sources included in the backlight unit 131 are implemented as LED elements, the driver IC may be implemented as at least one LED driver controlling currents applied to the LED elements. According to an embodiment, the LED driver may be arranged on the rear end of a power supply (e.g., a switching mode power supply (SMPS)), and receive a voltage from the power supply. Meanwhile, according to another embodiment, the LED driver may receive a voltage from a separate power device. Alternatively, it is also possible that the SMPS and the LED driver are implemented in the form of one integrated module.

The panel driver 133 may be implemented in a form of including a driver IC for driving the display panel 130. According to an embodiment, the driver IC may be implemented as separate hardware from the processor 120. For example, the panel driver 133 may include a data driver 113-1 providing video data to the data lines, and a gate driver 113-2 providing scan pulses to the gate lines.

The data driver 113-1 is a means for generating data signals, and it receives image data of R/G/B components from the processor 120 or the timing controller, and generates data signals. Also, the data driver 113-1 is connected with the data lines (DL1, DL2, DL3, DLm) of the display panel 130, and applies the generated data signals to the display panel 130.

The gate driver 113-2 (or a scan driver) is a means for generating gate signals (scan signals), and it is connected with the gate lines (GL1, GL2, GL3, GLn), and transmits gate signals to a specific row of the display panel 130. To a pixel to which a gate signal was transmitted, a data signal output from the data driver 113-1 is transmitted.

The processor 120 may simultaneously drive at least two gate lines by controlling the gate driver 113-2. That is, the processor 120 may transmit a signal to at least one of the data driver 113-1 or the gate driver 113-2, and thereby control the display panel 130. Through such an operation, the display time of frames is reduced, and a content may be displayed with a higher frame rate than the operation frequency of the display panel 130.

As described above, the display device 100 can improve the response characteristic by mixing a plurality of contents, and reducing the time that frames are displayed by adjusting the resolution of the frames of the mixed content.

Meanwhile, in the above, it was described that the plurality of image processing units 110, the scaler 140, and the frame rate change unit 150 are separate components from the processor 120, but the disclosure is not limited thereto. For example, at least one of the plurality of image processing units 110, the scaler 140, or the frame rate change unit 150 may also be implemented as one component of the processor 120.

Hereinafter, operations of the display device 100 will be described in more detail through various drawings. In the drawings below, each embodiment may be implemented individually, or may be implemented in a combined form. Also, hereinafter, it will be assumed that the display device 100 operates in the DLG mode.

Figure 3A:
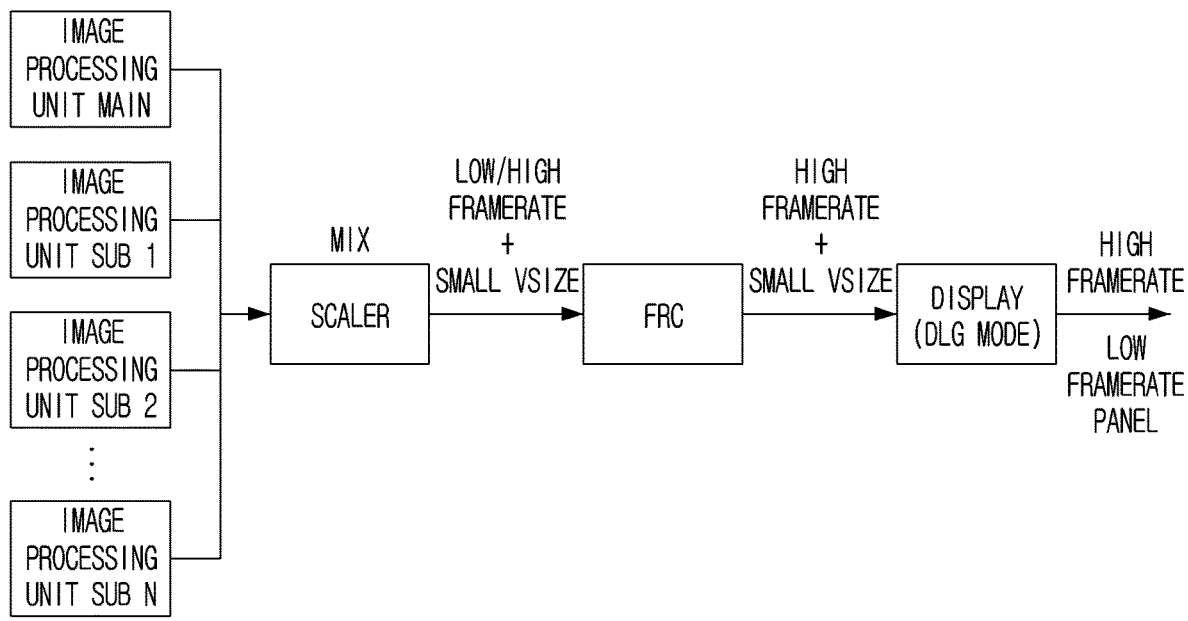
FIG. 3A and FIG. 3B are diagrams for illustrating implementation examples of a display device according to an embodiment of the disclosure.
Figure 3B:
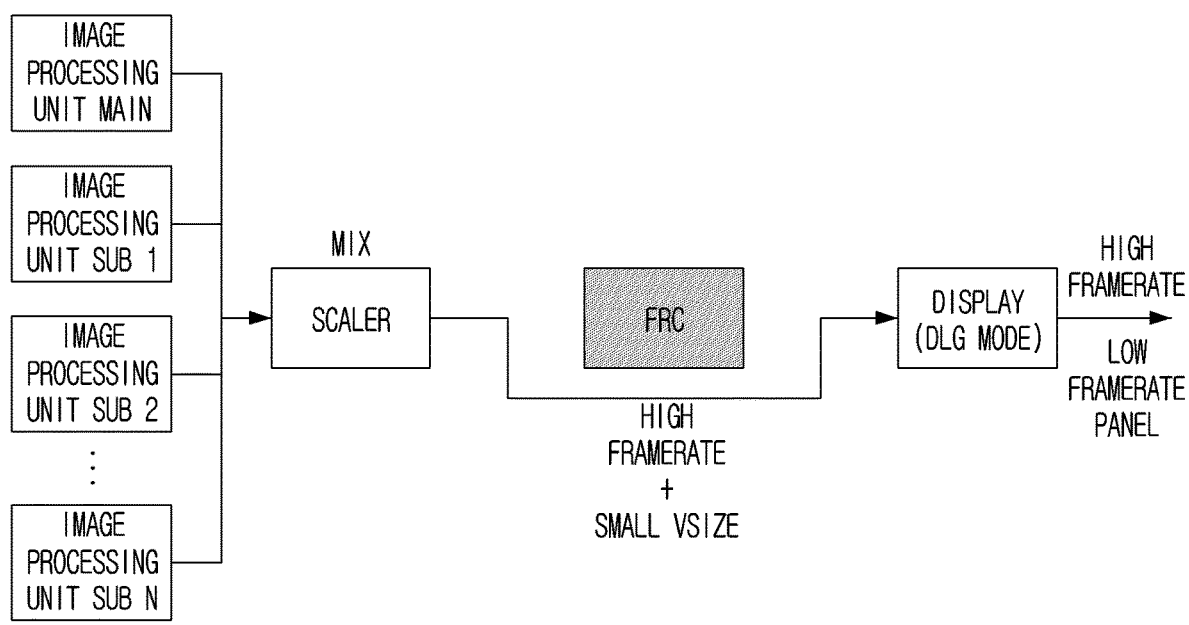

FIG. 3A and FIG. 3B are diagrams for illustrating implementation examples of the display device 100 according to an embodiment of the disclosure.

The plurality of image processing units 110 may respectively process a plurality of contents as images. For example, the plurality of image processing units 110 may respectively decode a plurality of contents, and perform additional image processing for improving the image quality.

The scaler 140 may change the frame rates of the plurality of contents output from the plurality of image processing units 110 to the same frame rate, mix the plurality of contents of which frame rates have been changed to the same frame rate, and change the vertical resolution of the mixed content.

As illustrated in FIG. 3A, the frame rate change unit 150 may upscale the frame rate of the mixed content based on the frame rate of the mixed content output from the scaler 140 and the operation frequency of the display panel 130. For example, if the frame rate of the mixed content and the operation frequency of the display panel 130 are the same, the frame rate change unit 150 may upscale the frame rate of the mixed content by twice. According to operation methods in the DLG mode other than the above, upscaling may be performed in numerous various scaling magnifications.

Alternatively, as illustrated in FIG. 3B, in case the frame rate of the mixed content corresponds to the DLG mode, the frame rate change unit 150 may not perform any operation. For example, if the frame rate of the mixed content is twice the operation frequency of the display panel 130, the frame rate change unit 150 may not perform any operation.

Meanwhile, if one of the plurality of contents is a variable refresh rates (VRR) content, the scaler 140 may change the frame rates of the plurality of contents to correspond to the VRR content. In this case, the frame rate change unit 150 may not perform an operation of changing the frame rates.

The display panel 130 may simultaneously drive two or more adjacent gate lines among the plurality of gate lines in the DLG mode, and thereby increase the frame rate of the mixed content output from the scaler 140 or the frame rate change unit 150, and output the content.

In FIG. 3A and FIG. 3B, it was described that the frame rate change unit 150 is connected between the display panel 130 and the scaler 140. However, the disclosure is not limited thereto, and other embodiments will be described through the following drawings.

Figure 4A:
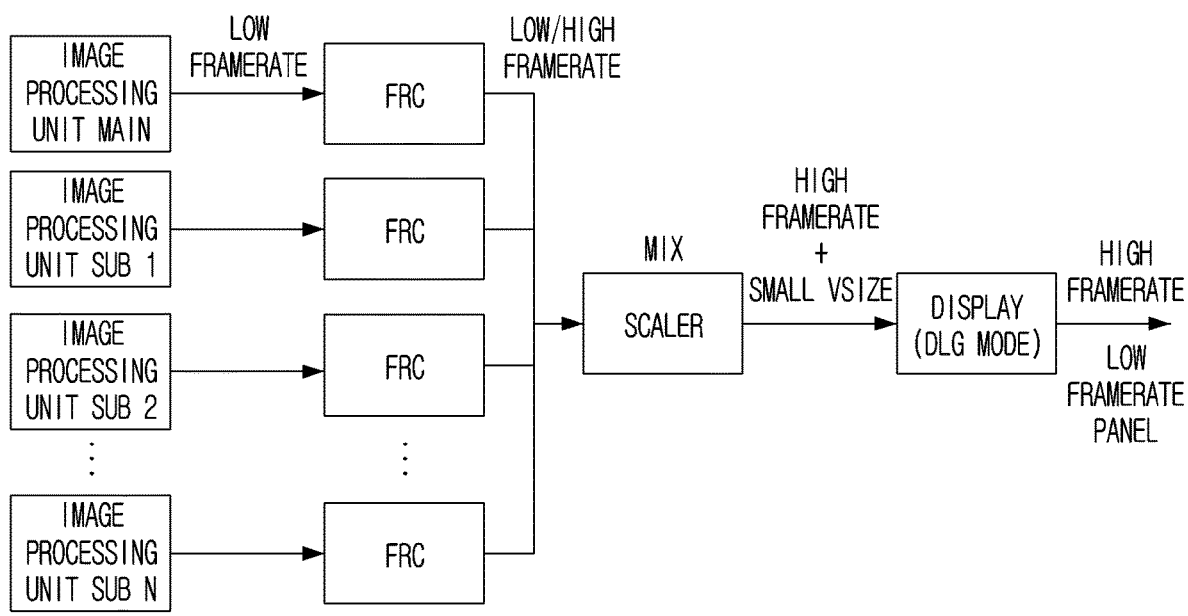
FIG. 4A and FIG. 4B are diagrams for illustrating implementation examples of a display device according to another embodiment of the disclosure.
Figure 4B:
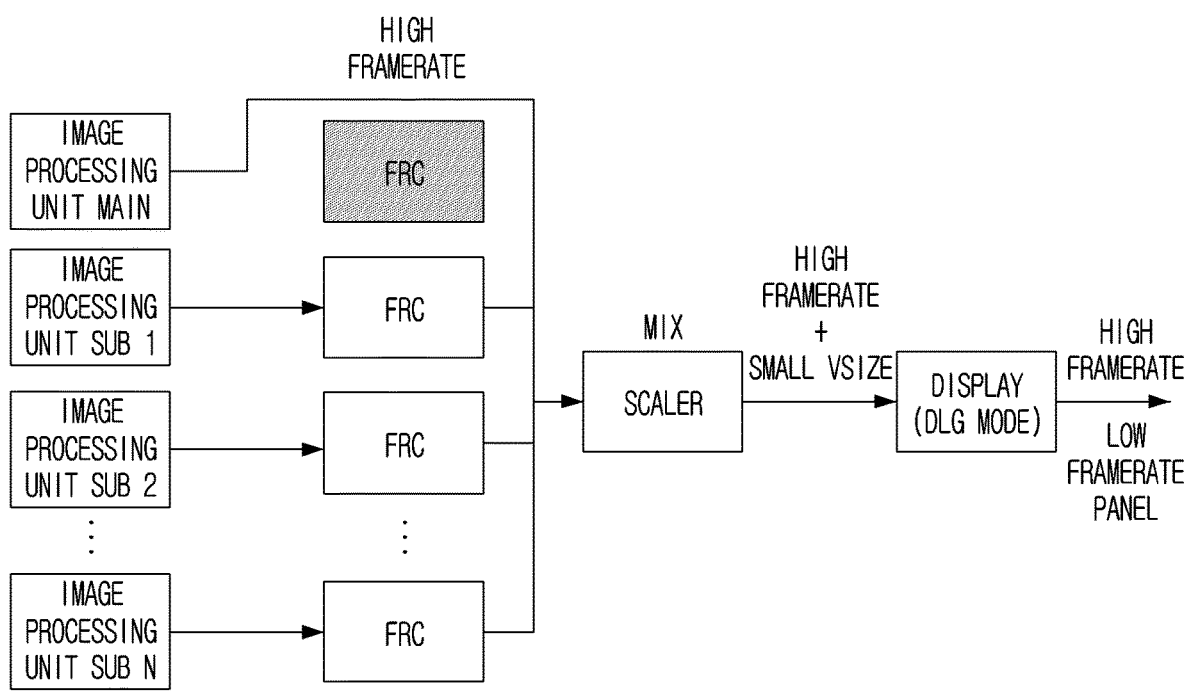

FIG. 4A and FIG. 4B are diagrams for illustrating implementation examples of the display device 100 according to another embodiment of the disclosure.

As illustrated in FIG. 4A, the frame rate change unit 150 may be a plurality of units, and the units may respectively be connected to the plurality of image processing units 110. The plurality of frame rate change units 150 may change the frame rates of the plurality of contents output from the plurality of image processing units 110 to the same frame rate, and provide the plurality of contents of which frame rates have been changed to the same frame rate to the scaler 140.

The scaler 140 may mix the plurality of contents of which frame rates have been changed to the same frame rate, and change the vertical resolution of the mixed content. The scaler 140 may upscale the frame rate of the mixed content based on the frame rate of the mixed content and the operation frequency of the display panel 130. For example, if the frame rate of the mixed content and the operation frequency of the display panel 130 are the same, the scaler 140 may upscale the frame rate of the mixed content by twice. According to operation methods in the DLG mode other than the above, upscaling may be performed in numerous various scaling magnifications.

Alternatively, in case the frame rate of the mixed content corresponds to the DLG mode, the scaler 140 may output the mixed content without changing its frame rate. For example, if the frame rate of the mixed content is twice the operation frequency of the display panel 130, the scaler 140 may output the mixed content without changing its frame rate.

That is, the operation of changing the frame rate by the scaler 140 may be determined depending on to which value the frame rates of the plurality of contents are changed by the plurality of frame rate change units 150.

Meanwhile, if one of the plurality of contents is a variable refresh rates (VRR) content, the frame rate change unit corresponding to the VRR content among the plurality of frame rate change units 150 (the first FRC in FIG. 4B) may not perform any operation. However, the remaining frame rate change units (the remaining FRCs in FIG. 4B) may change the frame rate of an input content to correspond to the VRR content.

Also, if one of the plurality of contents is a VRR content, the scaler 140 may not perform an operation of changing the frame rate, either.

Figure 5A:
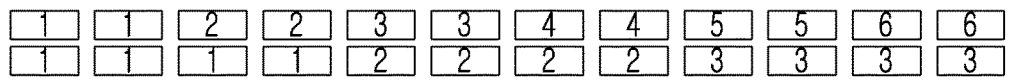
Figure 5A:
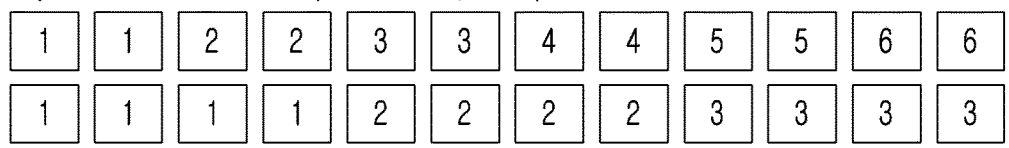

FIG. 5A and FIG. 5B are diagrams for illustrating a frame rate changing operation according to an embodiment of the disclosure.

As illustrated in FIG. 5A, the scaler 140 may change the second content to 60 Hz by a method of repeating some of the frames of the second content of 30 Hz between the first content of 60 Hz and the second content of 30 Hz. Then, the scaler 140 may mix the first content and the second content of which frame rate has been changed, and change the resolution of the mixed content.

The frame rate change unit 150 may change the frame rate to 120 Hz through repetition or interpolation of the mixed content, and the display panel 130 may display the content of 120 Hz through the DLG mode.

Alternatively, as illustrated in FIG. 5B, the scaler 140 may change the second content to 30 Hz by a method of skipping some of the frames of the second content of 60 Hz between the first content of 30 Hz and the second content of 60 Hz. Then, the scaler 140 may mix the first content and the second content of which frame rate has been changed, and change the resolution of the mixed content.

The frame rate change unit 150 may change the frame rate to 120 Hz through repetition or interpolation of the mixed content, and the display panel 130 may display the content of 120 Hz through the DLG mode.

Figure 6A:
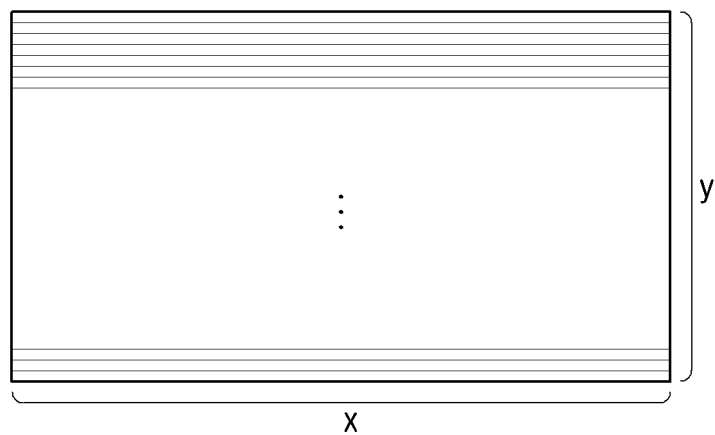
FIG. 6A and FIG. 6B are diagrams for illustrating a DLG mode operation of a display panel according to an embodiment of the disclosure.
Figure 6B:

FIG. 6A and FIG. 6B are diagrams for illustrating a DLG mode operation of the display panel 130 according to an embodiment of the disclosure.

The display panel 130 may be implemented as a panel of an x×y resolution. For example, the display panel 130 may be implemented as a panel of a 7680×4320 resolution. Alternatively, the display panel 130 may be implemented as a panel of a 3840×2160 resolution. However, this is merely an example, and the display panel 130 can be implemented in numerous different resolutions. Also, the ratio of the horizontal and the vertical lengths of the display panel 130 may be various in numerous ways such as 21:9, 32:9, etc.

In FIG. 6A, the display panel 130 implemented as a panel of an x×y resolution was illustrated, and for the convenience of explanation, only the vertical resolution was displayed in a distinguished state. That is, the display panel 130 implemented as a panel of an x×y resolution may be divided into areas having a long horizontal length in an y number.

The areas having a long horizontal length in the y number may be driven through one gate line. That is, the display panel 130 may include gate lines in they number.

FIG. 6B is a diagram for illustrating the operation frequency of the display panel 130 according to an embodiment of the disclosure. In FIG. 6B, it was assumed that the display panel 130 is a panel of 60 Hz.

As illustrated in FIG. 6B, the display panel 130 may display 60 sheets of frames for 1 second. That is, the display panel 130 may display one sheet of frame during 1/60s.

The display panel 130 may sequentially drive the gate lines in the y number for displaying one sheet of frame during 1/60s. If it is assumed that one gate line is driven at a time, the unit time that the one gate line is driven is 1/(60×y)s, and in case the entire gate lines are driven, the unit time may be repeated for the y times, and thus the time of 1/60s will be taken.

Alternatively, as in an embodiment of the disclosure, in case two gate lines are simultaneously driven, the unit time is 1/(60×y)s, but as the number of times of repetition for driving the entire gate lines is y/2 times, the time of 1/120s will be taken.

Also, when two gate lines are simultaneously driven, pixels that are adjacent in upper and lower directions get to display the same color with each other. That is, for pixels adjacent in upper and lower directions to display the same color with each other, the display panel 130 may be implemented as a panel of an 1D1G stripe structure. In this case, the gate terminals of the pixels adjacent in upper and lower directions are simultaneously turned on, and the same data value is input, and thus the two pixels adjacent in upper and lower directions may display the same color.

In contrast, in the case of a panel of an 1D1G crossed structure or a panel of a 2DHG structure, even if the first gate line and the second gate line are simultaneously driven, the data values input into the pixels adjacent in upper and lower directions are different, and thus the two pixels adjacent in upper and lower directions get to display different colors, and the disclosure cannot applied to this case. However, even in the case of a panel of an 1D1G crossed structure or a panel of a 2DHG structure, the disclosure may be applied in the case of a technology enabling display of the same color by simultaneously driving pixels adjacent in upper and lower directions.

Figure 7A:
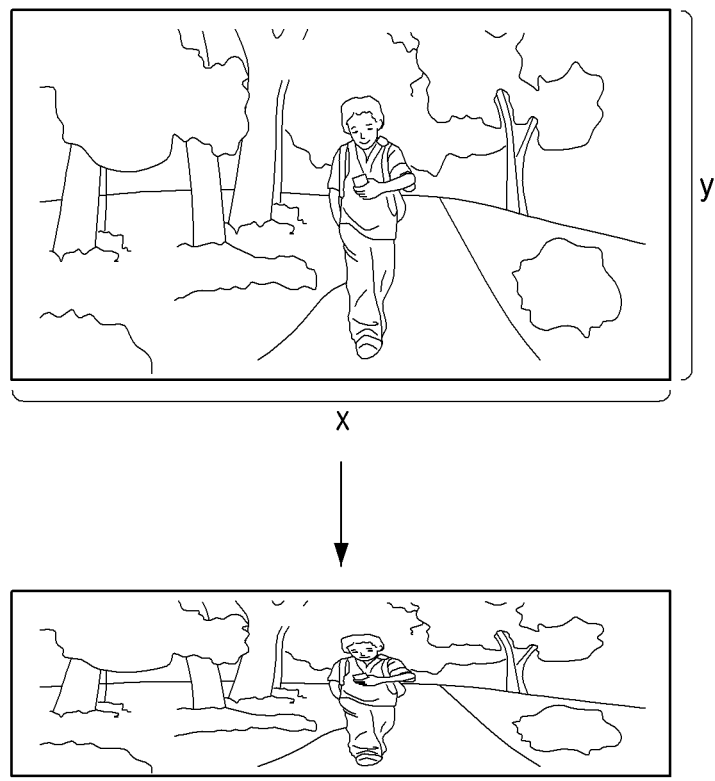
FIG. 7A, FIG. 7B and FIG. 7C are diagrams for illustrating an operation of displaying a content according to an embodiment of the disclosure.
Figure 7B:
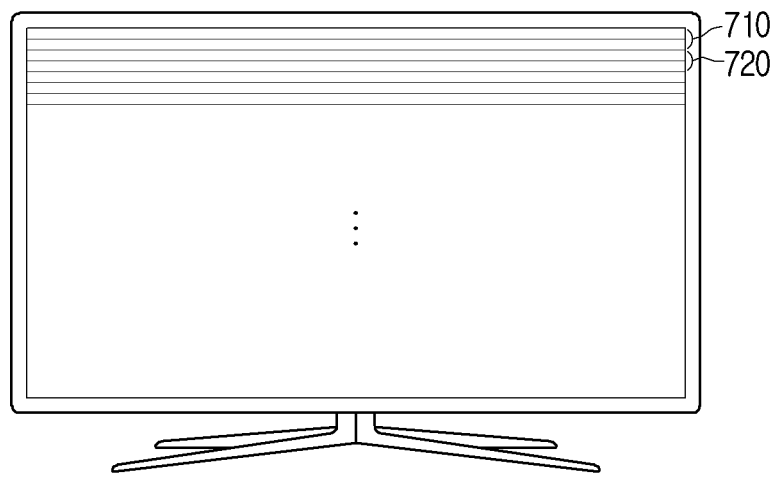
Figure 7C:
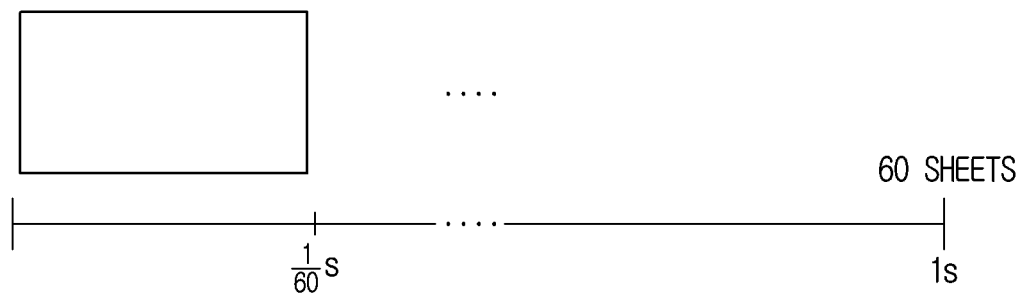
Figure 7C:
Figure 7C:
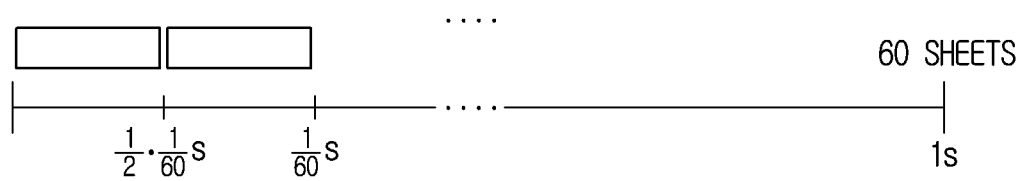

FIG. 7A to FIG. 7C are diagrams for illustrating an operation of displaying a mixed content according to an embodiment of the disclosure. In FIG. 7A to FIG. 7C, it was assumed that the display panel 130 is a panel of 60 Hz, and the frame rate of the content is 120 Hz.

The scaler 140 may adjust the resolution of the mixed content based on an equal division value of the vertical resolution of the display panel 130. For example, as illustrated in FIG. 7A, in case the display panel 130 is a panel of a 7680×4320 resolution, the scaler 140 may adjust the resolution of the content to 7680×2160.

The display panel 130 may simultaneously drive two adjacent gate lines among the plurality of gate lines. For example, as illustrated in FIG. 7B, the display panel 130 may display the pixel line of the first row of the content of which resolution has been adjusted to 7680×2160 by driving the two adjacent gate lines 710 in the upper part. Then, the display panel 130 may display the pixel line of the second row of the content of which resolution has been adjusted to 7680×2160 by driving the next two adjacent gate lines 720 in the upper part.

Through such a method, the display panel 130 can reduce the time of displaying one frame to half. For example, in case the operations as in FIG. 7A and FIG. 7B are not performed, the display panel 130 may display one frame during ⅟₆₀s, as illustrated in the upper part of FIG. 7C. In contrast, in case the operations as in FIG. 7A and FIG. 7B are performed, the display panel 130 may display one frame during 1/120s, as illustrated in the lower part of FIG. 7C. That is, the display panel 130 may display two frames during 1/60s.

Ultimately, the display panel 130 gets to display 60 frames during 1 second in the case of the upper part of FIG. 7C, but in the case of the lower part of FIG. 7C, the display panel 130 may display 120 frames during 1 second. That is, in the DLG mode, the driving speed of the gate lines of the display panel 130 is maintained as it is, and at the same time, the time of displaying one frame is reduced through decrease of the vertical resolution, and accordingly, an effect as if the frame rate has increased can be provided.

FIG. 8 is a flow chart for illustrating a control method of a display device according to an embodiment of the disclosure.

In a control method of a display device including a display panel driving a frame of a first resolution at a first frame rate, first, if a first mode displaying a content among a plurality of modes of the display device is changed to a second mode displaying a plurality of contents, the frame rates of a plurality of contents are changed to the same frame rate in operation S810. Then, the plurality of contents of which frame rates have been changed to the same frame rate are mixed in operation S820. Then, the vertical resolution of the mixed content is changed in operation S830. Then, the content of which vertical resolution has been changed is output at a second frame rate greater than the first frame rate through the display panel in operation S840.

Here, in the operation S830 of changing the vertical resolution of the mixed content, if at least one of the types of the plurality of contents is a predetermined type, the vertical resolution of the mixed content may be changed.

Then, in the operation S830 of changing the vertical resolution of the mixed content, the types of the plurality of contents may be identified based on metadata of the plurality of contents, and the predetermined type may be one of contents and sport contents of greater than or equal to a threshold frame rate.

Meanwhile, in the operation S810 of changing to the same frame rate, the frames of the remaining contents may be skipped or repeated based on one of the plurality of contents output from the plurality of image processing units, and the frame rates of the plurality of contents may be changed to the same frame rate.

Also, the control method may further include the operation of changing the frame rate of the content of which vertical resolution has been changed to the second frame rate, and in the operation S840 of outputting at the second frame rate, the content changed to the second frame rate may be output through the display panel.

Here, in the operation S840 of changing to the second frame rate, if the frame rate of the content of which vertical resolution has been changed is smaller than the second frame rate, the frame rate of the content of which vertical resolution has been changed may be changed to the second frame rate through copying or interpolation of the frame of the content of which vertical resolution has been changed.

Meanwhile, the control method may further include the operation of changing the frame rate of the plurality of contents of which frame rates have been changed to the same frame rate to the second frame rate, and in the operation S820 of mixing, the plurality of contents of which frame rate has been changed to the second frame rate may be mixed.

Also, in the operation S810 of changing to the same frame rate, if one of the plurality of contents is a variable refresh rates (VRR) content, the frame rates of the plurality of contents may be changed to correspond to the VRR content.

Meanwhile, in the operation S830 of changing the vertical resolution of the mixed content, the vertical resolution of the mixed content may be changed based on an equal division value of the vertical resolution of the display panel.

Also, the display panel may include a plurality of gate lines and a plurality of data lines, and each of the plurality of data lines may provide data to pixels of the same column, and in the operation S840 of outputting, two or more adjacent gate lines among the plurality of gate lines may be driven simultaneously based on the resolution of the display panel and the vertical resolution of the mixed content.

According to the various embodiments of the disclosure as described above, the display device can improve the response characteristic by mixing a plurality of contents, and reducing the time that frames are displayed by adjusting the resolution of the frames of the mixed content.

Also, as the display device can operate at a relatively smaller operation frequency than the frame rate of the mixed content, the display device can be implemented at a low cost.

In particular, as a content is produced in a high resolution recently, the image quality felt by a viewer is not reduced so much even if the vertical resolution of a mixed content is reduced to half, and at the same time, a feeling that the response characteristic has been improved can be provided.

Meanwhile, according to an embodiment of the disclosure, the various embodiments described above may be implemented as software including instructions stored in machine-readable storage media, which can be read by machines (e.g.: computers). The machines refer to devices that call instructions stored in a storage medium, and can operate according to the called instructions, and the devices may include an electronic device (e.g.: an electronic device A) according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, methods according to the various embodiments described above may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, according to an embodiment of the disclosure, the various embodiments described above may be implemented in a recording medium that can be read by a computer or a device similar to a computer, by using software, hardware, or a combination thereof. In some cases, the embodiments described in this specification may be implemented as a processor itself. According to implementation by software, the embodiments such as processes and functions described in this specification may be implemented as separate software modules. Each of the software modules can perform one or more functions and operations described in this specification.

Meanwhile, computer instructions for performing processing operations of a device according to the aforementioned various embodiments may be stored in a non-transitory computer-readable medium. Computer instructions stored in such a non-transitory computer-readable medium make the processing operations at the device according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disk, a blue-ray disk, a USB, a memory card, a ROM, and the like.

Also, each of the components according to the aforementioned various embodiments (e.g.: a module or a program) may consist of a singular object or a plurality of objects. Also, among the aforementioned corresponding sub-components, some sub-components may be omitted, or other sub-components may be further included in the various embodiments. Alternatively or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

Further, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display device comprising: a display panel to display a frame having a resolution up to a first frame rate; a plurality of image processing units; and a processor configured to: based on change from a first mode of displaying a content, among a plurality of modes of the display device, to a second mode of displaying plural contents, among the plurality of modes of the display device, change frame rates of a plurality of contents output from the plurality of image processing units to a same frame rate, mix the plurality of contents with the frame rates having been changed to the same frame rate, and change a vertical resolution of the mixed content, wherein the display panel outputs the content of which the vertical resolution has been changed at a second frame rate greater than the first frame rate.

2. The display device of claim 1, wherein
the frame rates of the plurality of contents is changed to the same frame rate, the plurality of contents with the frame rates changed to the same frame rate are mixed, and the vertical resolution of the mixed content is changed based on at least one of the plurality of contents being a predetermined type.

3. The display device of claim 2, wherein the processor is configured to:
identify types of the plurality of contents based on metadata of the plurality of contents, and
the predetermined type is one of contents and sport contents of greater than or equal to a threshold frame rate.

4. The display device of claim 1, wherein the processor is configured to:
skip or repeat frames of remaining contents among the plurality of contents based on one of the plurality of contents output from the plurality of image processing units and change the frame rates of the plurality of contents to the same frame rate.

5. The display device of claim 1, further comprising:
a frame rate change unit that receives the mixed content of which vertical resolution has been changed from the processor, and changes the frame rate of the content of which vertical resolution has been changed to the second frame rate,
wherein the display panel outputs the mixed content at the second frame rate.

6. The display device of claim 5,
wherein the frame rate change unit, based on the frame rate of the mixed content of which vertical resolution has been changed being smaller than the second frame rate, changes the frame rate of the mixed content of which vertical resolution has been changed to the second frame rate through copying or interpolation of the frame of the content of which vertical resolution has been changed.

7. The display device of claim 1, further comprising:
a plurality of frame rate change units connected to each of the plurality of image processing units, wherein the plurality of frame rate change units change the plurality of contents output from the plurality of image processing units to the second frame rate, and provide the plurality of contents changed to the second frame rate to the processor.

8. The display device of claim 1, wherein the processor is configured to:
based on one of the plurality of contents being a variable refresh rates (VRR) content, change the frame rates of the plurality of contents to correspond to the VRR content.

9. The display device of claim 1, wherein the processor is configured to:
change the vertical resolution of the mixed content based on an equal division value of a vertical resolution of the display panel.

10. The display device of claim 1, wherein the display panel comprises:
a plurality of gate lines and a plurality of data lines, and wherein the display device simultaneously drives two or more adjacent gate lines among the plurality of gate lines based on the resolution of the display panel and the vertical resolution of the mixed content, and
each of the plurality of data lines provides data to pixels of a same column.

11. A control method of a display device comprising a display panel to display a frame of a first resolution up to a first frame rate, the method comprising: based on change from a first mode of displaying a content, among a plurality of modes of the display device, to a second mode of displaying plural contents, among the plurality of modes of the display device, changing frame rates of a plurality of contents output from a plurality of image processing units to a same frame rate; mixing the plurality of contents with the frame rates having been changed to the same frame rate; changing a vertical resolution of the mixed content; and outputting the mixed content of which the vertical resolution has been changed at a second frame rate greater than the first frame rate through the display panel.

12. The control method of claim 11, wherein the vertical resolution of the mixed content is changed based on at least one of types of the plurality of contents being a predetermined type.

13. The control method of claim 12, wherein the changing the vertical resolution of the mixed content comprises:
identifying types of the plurality of contents based on metadata of the plurality of contents, and
the predetermined type is one of contents and sport contents of greater than or equal to a threshold frame rate.

14. The control method of claim 11, wherein the changing to the same frame rate comprises: skipping or repeating frames of remaining contents among the plurality of contents based on one of the plurality of contents output from the plurality of image processing units and changing the frame rates of the plurality of contents to the same frame rate.

15. The control method of claim 11, further comprising:
changing the frame rate of the mixed content of which vertical resolution has been changed to the second frame rate,
wherein the outputting at the second frame rate comprises:
outputting the mixed content changed to the second frame rate through the display panel.

16. The display device of claim 15,
wherein the changing the frame rate of the mixed content of which vertical resolution has been changed to the second frame rate comprises, based on the frame rate of the mixed content of which vertical resolution has been changed being smaller than the second frame rate, changing the frame rate of the mixed content of which vertical resolution has been changed to the second frame rate through copying or interpolation of the frame of the content of which vertical resolution has been changed.

17. The display device of claim 11, further comprising:
changing the plurality of contents with the frame rates having been changed to the same frame rate to the second frame rate, and
wherein the mixing comprises mixing the plurality of contents changed to the second frame rate.

18. The display device of claim 11, wherein the changing frame rates of the plurality of contents to the same frame rate comprises, based on one of the plurality of contents being a variable refresh rates (VRR) content, changing the frame rates of the plurality of contents to correspond to the VRR content.

19. The display device of claim 11, wherein the changing the vertical resolution of the mixed content comprises changing the vertical resolution of the mixed content based on an equal division value of a vertical resolution of the display panel.

20. A non-transitory recording medium for storing a program for performing an operation method of a display device for displaying a frame of a first resolution up to a first frame rate, wherein the operation method comprising: based on change from a first mode of displaying a content, among a plurality of modes of the display device, to a second mode of displaying plural contents, among the plurality of modes of the display device, changing frame rates of a plurality of contents output from a plurality of image processing units to a same frame rate; mixing the plurality of contents with the frame rates having been changed to the same frame rate; changing a vertical resolution of the mixed content; and outputting the mixed content of which the vertical resolution has been changed at a second frame rate greater than the first frame rate through the display panel.

* * * * *